(12) United States Patent
Jang (10) Patent No.: US 8,374,554 B2
(45) Date of Patent: Feb. 12, 2013

(54) COMMUNICATION SYSTEM FOR ADJUSTING MODE OF COLLECTING INTERFERENCE CHANNEL INFORMATION

(75) Inventor: Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

(21) Appl. No.: 12/626,648

(22) Filed: Nov. 26, 2009

(65) Prior Publication Data

US 2010/0291945 A1  Nov. 18, 2010

(30) Foreign Application Priority Data

May 12, 2009  (KR) .................. 10-2009-0041090

(51) Int. Cl.
*H04B 17/00* (2006.01)
(52) U.S. Cl. ............. 455/67.11; 455/63.1; 455/67.13; 455/69; 455/452.2; 370/332; 370/235; 370/328; 375/260; 375/285; 375/267
(58) Field of Classification Search ........... 455/7, 69, 455/452.2, 436, 450, 458, 562.1, 101, 444, 455/67.11, 63.1, 67.13; 370/210, 235, 328, 370/330, 332; 340/539.1, 572.7; 375/260, 375/285, 267
See application file for complete search history.

(56) References Cited

U.S. PATENT DOCUMENTS

| | | | | |
|---|---|---|---|---|
| 2010/0227567 | A1* | 9/2010 | Dinan et al. | 455/69 |
| 2010/0279602 | A1* | 11/2010 | Larsson et al. | 455/7 |

FOREIGN PATENT DOCUMENTS

| | | |
|---|---|---|
| KR | 10-0496344 | 12/2000 |
| KR | 10-0837061 | 3/2007 |
| KR | 1020070112932 | 11/2007 |
| KR | 1020080085886 | 9/2008 |

* cited by examiner

*Primary Examiner* — Kamran Afshar
*Assistant Examiner* — Manpreet Matharu
(74) *Attorney, Agent, or Firm* — NSIP Law (57) ABSTRACT

A plurality of transmit-receive pairs may operate in any one mode between an orthogonal mode and a concurrent mode. The transmit-receive pairs may collect interference channel information in a different time interval when operating in an orthogonal mode. In a concurrent mode, the transmit-receive pairs may apply a simultaneous transmission/reception scheme based on the collected interference channel information.

22 Claims, 11 Drawing Sheets

PROCESS OF COLLECTING INTERFERENCE
CHANNEL INFORMATION IN ORTHOGONAL MODE

COMMUNICATION SYSTEM FOR ADJUSTING MODE OF COLLECTING INTERFERENCE CHANNEL INFORMATION

CROSS-REFERENCE TO RELATED APPLICATION(S)

This application claims the benefit under 35 U.S.C. §119(a) of a Korean Patent Application No. 10-2009-0041090, filed May 12, 2009, in the Korean Intellectual Property Office, the entire disclosure of which is incorporated herein by reference for all purposes.

BACKGROUND

1. Field

The following description relates to a communication system and more particularly, to a communication system that may collect interference channel information to apply a simultaneous transmission/reception scheme using the collected interference channel information.

2. Description of Related Art

The development of communication systems having a plurality of transmit-receive pairs includes modifying and enhancing data transmission rates and communication reliability. In a communication system, transmit-receive pairs may use the same frequency resource in order to enhance a frequency efficiency. In such a case, interference may occur between the transmit-receive pairs. Accordingly, researches are being conducted to decrease the amount of interference or eliminate the interference by sharing interference channel information associated with the transmit-receive pairs.

However, there exist some difficulties in sharing the interference channel information of the transmit-receive pairs. For example, the interference channel information may not be fixed, and instead, may vary in real time. Accordingly, there is a desire to update the shared interference channel information in response to a change in the interference channel information. The sharing of the interference channel information may, however, cause the amount of overhead in the communication system to increase.

SUMMARY

In one general aspect, a communication control method includes selecting any one mode from an orthogonal mode and a concurrent mode in association with a scheme where the plurality of transmit-receive pairs collects interference channel information, and providing information associated with the selected mode to the plurality of transmit-receive pairs. Each of the transmit-receive pairs may collect the interference channel information in a different time in the orthogonal mode. The plurality of transmit-receive pairs may apply a simultaneous transmission/reception scheme based on the collected interference channel information in the concurrent mode.

Where a previously selected mode is the orthogonal mode, the selecting of any one mode may include selecting any one mode from the orthogonal mode and the concurrent mode by considering whether the plurality of transmit-receive pairs applies the simultaneous transmission/reception scheme based on the collected interference channel information.

Where a previously selected mode is the concurrent mode, the selecting of any one mode may include selecting any one mode from the orthogonal mode and the concurrent mode depending on whether the collected interference channel information is valid.

Whether the collected interference channel information is valid may be predicted based on a reception quality of the transmit-receive pairs.

The method may further include providing, to the plurality of transmit-receive pairs, information used by the plurality of transmit-receive pairs in order to apply the simultaneous transmission/reception scheme where the concurrent mode is selected.

Information used by the plurality of transmit-receive pairs in order to apply the simultaneous transmission/reception scheme may include information associated with an interference signal processing scheme.

The providing of information may include providing information associated with the selected mode where the selected mode is changed.

In the concurrent mode, the plurality of transmit-receive pairs may apply the simultaneous transmission/reception scheme with suspending collecting of additional interference channel information.

The simultaneous transmission/reception scheme may include an interference control scheme or a transmit power control scheme.

The method may further include scheduling a time resource so that each of the transmit-receive pairs collects the interference channel information in the different time interval, where the orthogonal mode is selected.

The scheduling of the time resource may include scheduling the time resource so that the plurality of transmit-receive pairs sequentially measures interference channels to sequentially report the interference channel information with respect to the measured interference channels in the orthogonal mode.

The selecting of any one mode may include selecting the orthogonal mode at an initial point in time where the plurality of transmit-receive pairs is constructed.

The plurality of transmit-receive pairs may use the same frequency resource.

In another general aspect, a communication method of a transmit-receive pair includes receiving, from an inter-cell coordinator, information associated with a mode selected between an orthogonal mode and a concurrent mode, determining whether the selected mode is the orthogonal mode or the concurrent mode, collecting interference channel information in a time interval different from time intervals for neighboring transmit-receive pairs in order to report the interference channel information to the inter-cell coordinator, where the selected mode is the orthogonal mode, and applying a simultaneous transmission/reception scheme together with the neighboring transmit-receive pairs, where the selected mode is the concurrent mode.

The method may further include providing, to the inter-cell coordinator, information associated with a reception quality of the transmit-receive pairs that is used to determine whether to change the selected mode, where the selected mode is the concurrent mode.

The providing of information may include providing, to the inter-cell coordinator, information associated with the reception quality of the transmit-receive pairs, where the reception quality is less than a particular level.

The collecting of interference channel information may include receiving scheduling information associated with a time resource to collect the interference channel information, and obtaining the interference channel information in the time interval different from the time intervals for the neighboring transmit-receive pairs based on the scheduling information.

The applying of the simultaneous transmission/reception scheme may include applying the simultaneous transmission/reception scheme with suspending collecting of additional interference channel information, where the selected mode is the concurrent mode.

The simultaneous transmission/reception scheme may include an interference control scheme or a transmission power control scheme.

A computer-readable recording medium may store a program to implement the communication control method.

In still another general aspect, an inter-cell coordinator includes a selection unit configured to select any one mode from an orthogonal mode and a concurrent mode in association with a scheme where a plurality of transmit-receive pairs collects interference channel information, and a provider configured to provide information associated with the selected mode to the plurality of transmit-receive pairs. Each of the transmit-receive pairs may collect the interference channel information in a different time interval in the orthogonal mode. The plurality of transmit-receive pairs may apply a simultaneous transmission/reception scheme based on the collected interference channel information in the concurrent mode.

In yet another general aspect, a communication apparatus for a transmit-receive pair includes a receiver configured to receive, from an inter-cell coordinator, information associated with a mode selected between an orthogonal mode and a concurrent mode, a decision unit configured to determine whether the selected mode is the orthogonal mode or the concurrent mode, a collection unit configured to collect interference channel information in a time interval different from time intervals for neighboring transmit-receive pairs in order to report the interference channel information to the inter-cell coordinator, where the selected mode is the orthogonal mode, and a module configured to apply a simultaneous transmission/reception scheme together with the neighboring transmit-receive pairs, where the selected mode is the concurrent mode.

Other features and aspects will become apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions may be omitted for increased clarity and conciseness.

Figure 1:
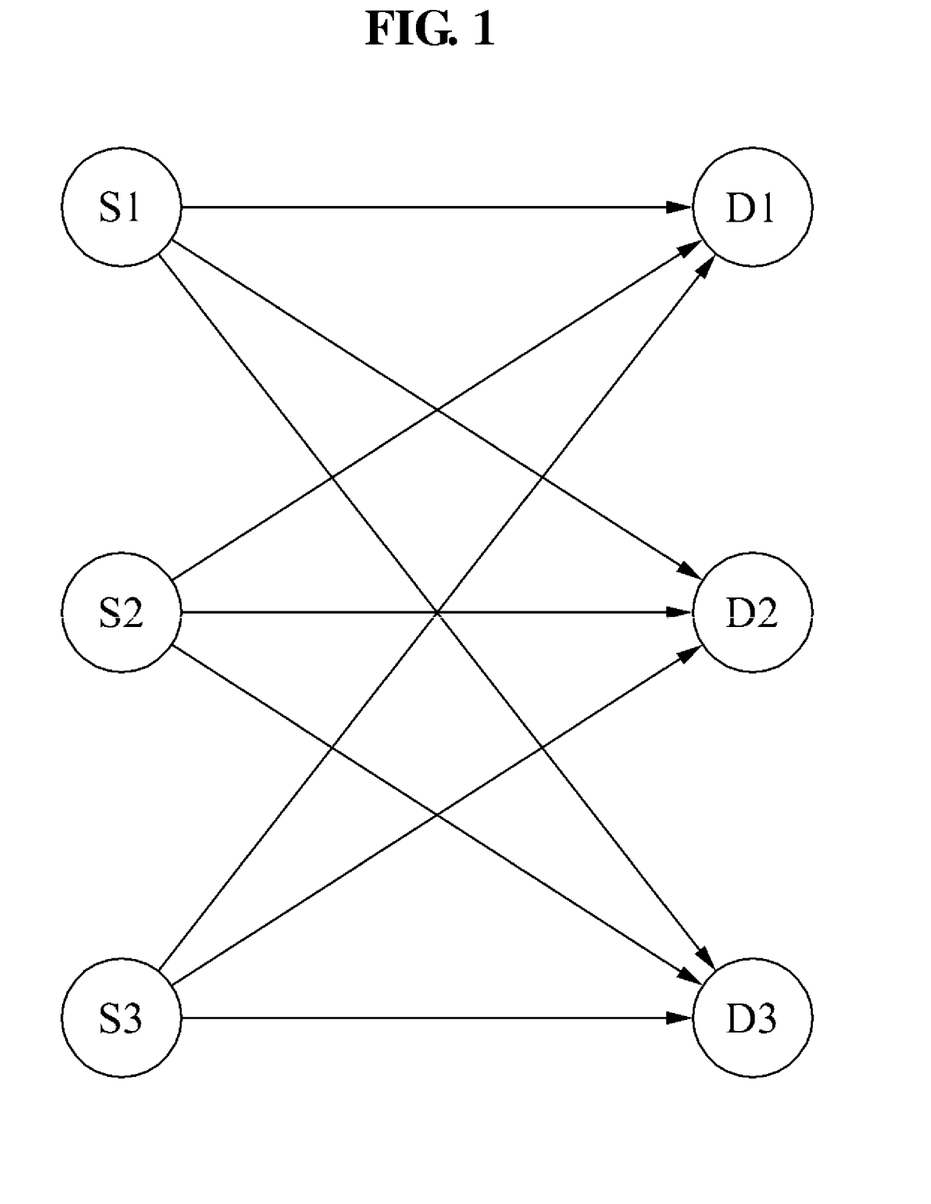
FIG. 1 is a diagram illustrating an exemplary communication system including a plurality of transmit-receive pairs.

FIG. 1 illustrates an exemplary communication system including a plurality of transmit-receive pairs.

In the exemplary communication system of FIG. 1, the transmit-receive pairs may comprise a source node S1 and a destination node D1, a source node S2 and a destination node D2, and a source node S3 and a destination node D3. Each of the source nodes S1, S2, and S3 denotes a transmitter, for example, a base station or a relay in a downlink of a cellular system and a terminal or a relay in an uplink of the cellular system. Each of the destination nodes D1, D2, and D3 denotes a receiver, for example, a terminal or the relay in the downlink of the cellular system and a base station or the relay in the uplink of the cellular system.

Where each of the source nodes S1, S2, and S3 transmits data using the same frequency resource, interference may occur in each of the destination nodes D1, D2, and D3. For example, in the destination node D1, a signal received from the source node S1 corresponds to a desired signal and signals received from the source nodes S2 and S3 correspond to interference. Similarly, interference may occur even in the destination nodes D2 and D3. The above interference may decrease a throughput of the communication system.

The decrease in the throughput which may be caused by the interference may be prevented by appropriately using a simultaneous transmission/reception scheme. For example, the simultaneous transmission/reception scheme may include an interference control scheme or a transmit power control scheme. For example, the interference control scheme may include an interference alignment scheme, an interference treated as noise (ITN) scheme, an interference neutralization scheme, and the like.

Examples of the simultaneous transmission/reception scheme, that is, the interference control scheme and the transmit power control scheme, are described below.

According to the interference alignment scheme, each of the source nodes S1, S2, and S3 may design a precoding matrix so that interference in each of the destination nodes D1, D2, and D3 may be aligned. Each of the source nodes S1, S2, and S3 may use a decoding matrix to align and reduce or eliminate the interference. The precoding matrix and the decoding matrix may be calculated based on interference channel information of the destination nodes D1, D2, and D3.

Interference channels of the destination node D1 may denote a channel between the source node S2 and the destination node D1 and a channel between the source node S3 and the destination node D1. Interference channels of the destination node D2 may denote a channel between the source node S1 and the destination node D2 and a channel between the source node S3 and the destination node D2. Similarly, interference channels of the destination node D3 may denote a channel between the source node S1 and the destination node D3 and a channel between the source node S2 and the destination node D3.

Each of the destination nodes D1, D2, and D3 may feed back, to the source nodes S1, S2, and S3, interference channel information associated with the interference channels, so that the transmit-receive pairs may apply the interference alignment scheme. In order to apply the interference alignment scheme, the source nodes S1, S2, and S3 may share the interference channel information of the destination nodes D1, D2, and D3. The interference alignment scheme may include the interference neutralization scheme to control transmission signals of the source nodes S1, S2, and S3, so that phases of interference signals may be opposite to each other.

The interference treated as noise (ITN) scheme may generate transmission signals of the source nodes S1, S2, and S3 to decrease a strength of interference signals of each of the destination nodes D1, D2, and D3. For example, the interference treated as noise (ITN) scheme may generate the transmission signals so that a sum of the interference signals may be less than a particular level, or so that the sum of interference signals may be relatively smaller than a magnitude of the desired signal.

The interference neutralization scheme may control the phases of the transmission signals so that the transmission signals may have opposite phases. According to the interference neutralization scheme, the destination nodes D1, D2, and D3 may consider the interference signals with the opposite phases as a single interference signal.

The transmit power control scheme may adjust the strength of interference signals based on gains of interference channels. For example, the throughput of the communication system may be enhanced by controlling a transmit power of each of the source nodes S1, S2, and S3 based on gains of interference channels according to a frequency, and a gain of a channel corresponding to the desired signal. An example of the transmit power control scheme may include a dynamic spectrum management scheme.

The interference control scheme and the transmit power control scheme included in the simultaneous transmission/reception scheme are described above. To apply the simultaneous transmission/reception scheme, the transmit-receive pairs may share the interference channel information. More particularly, changes in the interference channels may be reflected in real time in order to apply the simultaneous transmission/reception scheme. Where the interference channel information is shared and the changes in the interference channels are reflected in real time, it may increase the overhead in the communication system. Where the simultaneous transmission/reception scheme is applied without reflecting the changes in the interference channels for an extended period of time, the use of the simultaneous transmission/reception scheme may be less effective and the frequency efficiency may not be enhanced.

A tradeoff relationship may exist to reflect the changes in the interference channels in real time and to decrease the overhead in the communication system. Accordingly, in one aspect, a technology is disclosed that may decrease the overhead in the communication system and may also appropriately reflect the changes of the interference channels.

Figure 2:
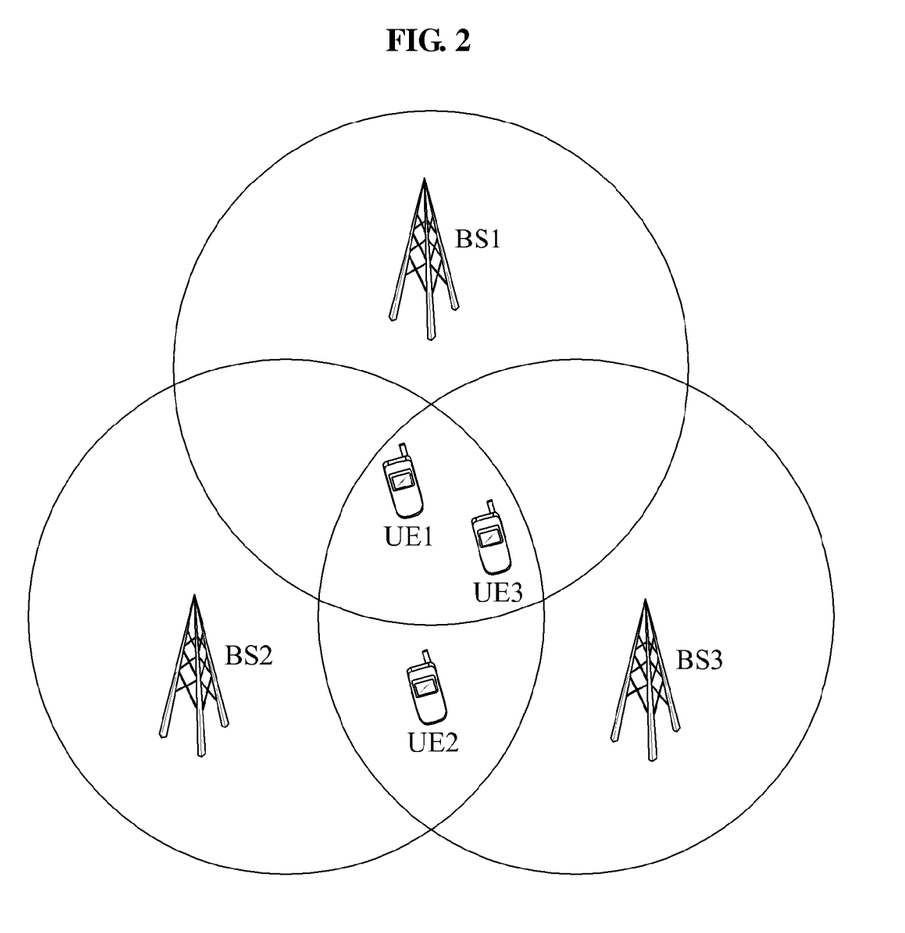
FIG. 2 is a diagram illustrating an exemplary communication system including a plurality of transmit-receive pairs in multiple cells.

FIG. 2 illustrates an exemplary communication system including a plurality of transmit-receive pairs in multiple cells.

The multiple cells may include a plurality of transmit-receive pairs. For example, one cell includes a transmit-receive pair consisting of a base station BS1 and a terminal UE1. Another cell includes a transmit-receive pair consisting of a base station BS2 and a terminal UE2. Still another cell includes a transmit-receive pair consisting of a base station BS3 and a terminal UE3.

Where all the cells use the same frequency resource, interference may occur in an edge of each of the cells. The aforementioned simultaneous transmission/reception scheme may be applicable to enhance the frequency efficiency. Accordingly, in another aspect, a technology is disclosed that may decrease the overhead in the communication system and may appropriately reflect changes of interference channels in the multiple cells of FIG. 2.

Figure 3:
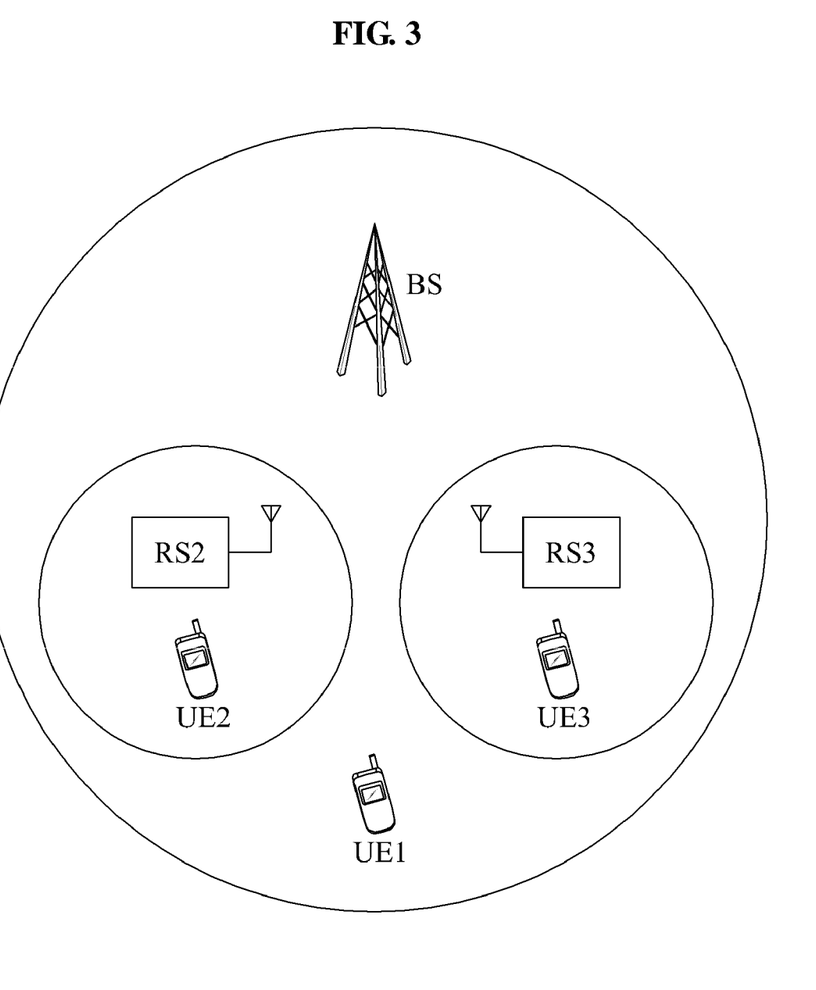
FIG. 3 is a diagram illustrating an exemplary communication system including a plurality of transmit-receive pairs in a macro cell containing a relay.

FIG. 3 illustrates an exemplary communication system including a plurality of transmit-receive pairs in a macro cell containing relays RS2 and RS3.

The macro cell includes a base station BS, the relays RS2 and RS3, and terminals UE1, UE2, and UE3.

Where the base station BS, the relays RS2 and RS3, and the terminals UE1, UE2, and UE3 use the same frequency resource, interference may occur between a coverage of the base station BS and coverages of the respective relays RS2 and RS3, and between the coverage RS2 and the coverage of the RS3. Accordingly, the aforementioned technical difficulties may occur even in the communication system of FIG. 3.

Figure 4:
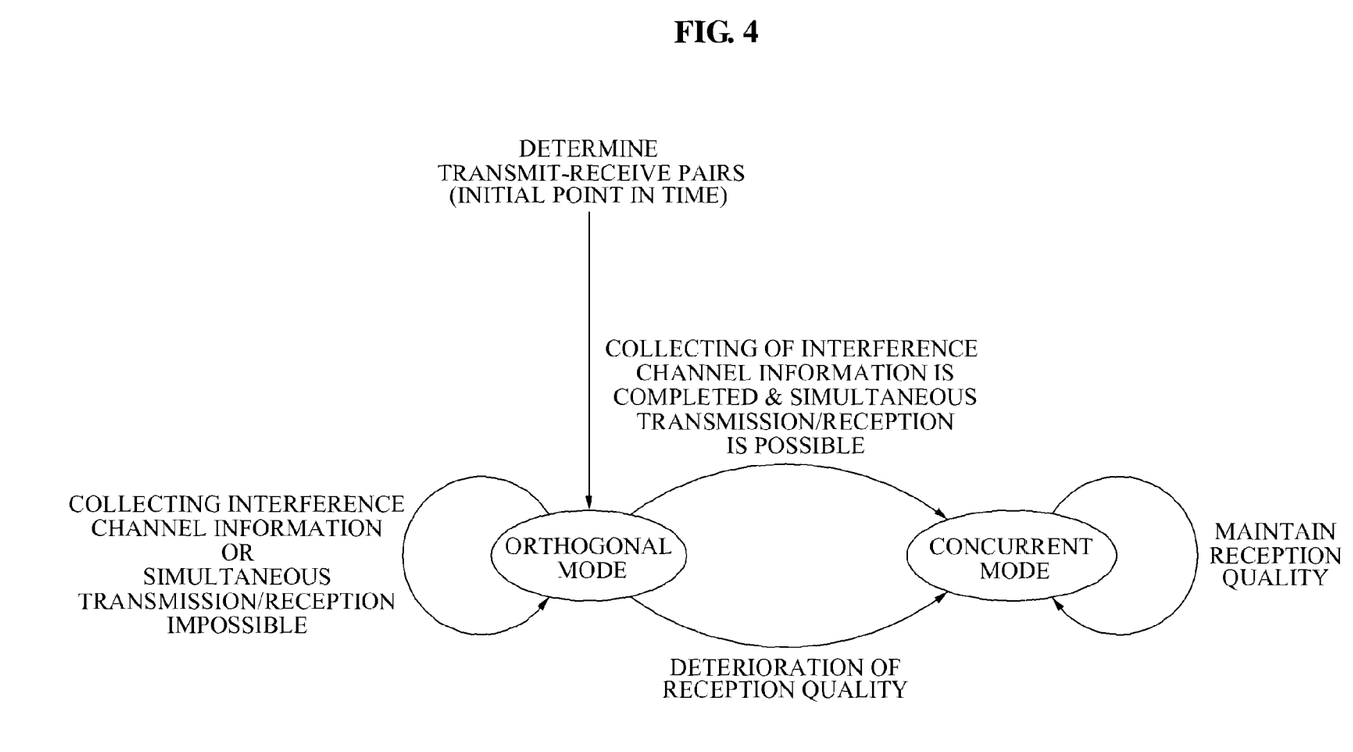
FIG. 4 is a diagram illustrating an exemplary relationship between an orthogonal mode and a concurrent mode.

FIG. 4 illustrates an exemplary relationship between an orthogonal mode and a concurrent mode.

Referring to FIG. 4, according to exemplary embodiments consistent with teachings herein, any one mode between the orthogonal mode and the concurrent mode may be used in association with a scheme where a plurality of transmit-receive pairs collects interference channel information.

The plurality of transmit-receive pairs may be determined according to various types of criteria. For example, terminals and base stations located in a region where coverages of cells overlap may be determined as the transmit-receive pairs.

The orthogonal mode may be selected at an initial point in time where the plurality of transmit-receive pairs is determined. In the orthogonal mode, each of the transmit-receive pairs may collect interference channel information in a different time interval. For example, an inter-cell coordinator managing the transmit-receive pairs may appropriately schedule a time resource so that each of the transmit-receive pairs may collect the interference channel information in the different time interval in the orthogonal mode. For example, the inter-cell coordinator may schedule the time resource so that the plurality of transmit-receive pairs may sequentially measure interference channels to sequentially report the interference channel information with respect to the measured interference channels in the orthogonal mode. Exemplary embodiments of scheduling the time resource in the orthogonal mode are further described below.

Where the plurality of transmit-receive pairs collects the interference channel information and completes reporting of the collected interference channel information, the inter-cell coordinator may determine whether the plurality of transmit-receive pairs may successfully use a simultaneous transmission/reception scheme. Where the plurality of transmit-receive pairs may successfully use the simultaneous transmission/reception scheme, the inter-cell coordinator may change the orthogonal mode to the concurrent mode. That the orthogonal mode is changed to the concurrent mode may be known to the plurality of transmit-receive pairs.

Where the plurality of transmit-receive pairs does not complete collecting and reporting of the interference channel information, or where the plurality of transmit-receive pairs may not successfully use the simultaneous transmission/reception scheme, the inter-cell coordinator may maintain the orthogonal mode as is. The plurality of transmit-receive pairs may continuously collect and report the interference channel information using the scheduled time resource.

As described above, where the plurality of transmit-receive pairs completes collecting and reporting of the interference channel information, and the plurality of transmit-receive pairs may successfully use the simultaneous transmission/reception scheme, the plurality of transmit-receive pairs may operate in the concurrent mode. In the concurrent mode, the plurality of transmit-receive pairs may apply the simultaneous transmission/reception scheme based on the interference channel information collected in the orthogonal mode. In this instance, information used by the plurality of transmit-receive pairs for applying the simultaneous transmission/reception scheme, for example, information associated with an interference signal processing scheme may be transferred from the inter-cell coordinator to the plurality of transmit-receive pairs. The simultaneous transmission/reception scheme may include the interference control scheme, the transmit power control scheme, and the like, which are described above in detail.

By suspending collecting and reporting of the interference channel information in the concurrent mode, it is possible to decrease the overhead in the communication system. In preparation for the occurrence of a change in the interference channel information collected in the orthogonal mode, the plurality of transmit-receive pairs may continuously or periodically check whether the interference channel information is valid.

For example, the plurality of transmit-receive pairs may continuously or periodically check a reception quality. The reception quality may be determined based on a signal-to-interference plus noise ratio (SINR), a bit error rate (BER), and the like. Where the reception quality is less than a particular level, a corresponding transmit-receive pair may transfer, to the inter-cell coordinator, a report that the reception quality is deteriorated. The inter-cell coordinator may change the orthogonal mode to the concurrent mode. Conversely, where the reception quality of all the transmit-receive pairs is maintained to be greater than the particular level, the concurrent mode may be maintained as is. The transmit-receive pairs may perform communication using the simultaneous transmission/reception scheme.

Figure 5:
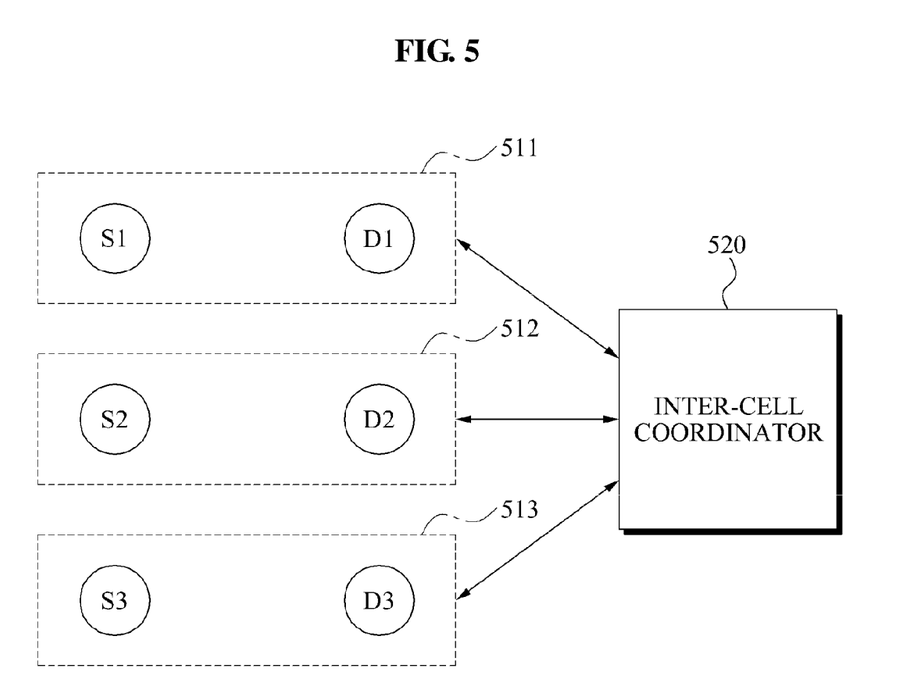
FIG. 5 is a diagram illustrating an exemplary inter-cell coordinator and a plurality of transmit-receive pairs.

FIG. 5 illustrates an exemplary inter-cell coordinator 520 and a plurality of transmit-receive pairs 511, 512, and 513.

The transmit-receive pairs 511, 512, and 513 are managed by the inter-cell coordinator 520. For example, the inter-cell coordinator 520 may select any one mode from an orthogonal mode and a concurrent mode, and the transmit-receive pairs 511, 512, and 513 may operate according to the selected mode.

Where the orthogonal mode is selected, the inter-cell coordinator 520 may appropriately schedule a time resource in association with collecting of interference channel information, and may provide scheduling information to the transmit-receive pairs 511, 512, and 513. Here, the transmit-receive pairs 511, 512, and 513 may collect and report the interference channel information based on the scheduling information.

Where the concurrent mode is selected, the transmit-receive pairs 511, 512, and 513 may use a simultaneous transmission/reception scheme. The transmit-receive pairs 511, 512, and 513 may report to the inter-cell coordinator 520 about information associated with a reception quality. For example, where the reception quality is less than a particular level, the transmit-receive pairs 511, 512, and 513 may report reception quality information to the inter-cell coordinator 520. Where the reception quality is less than the particular level, the concurrent mode may be changed to the orthogonal mode and the transmit-receive pairs 511, 512, and 513 may operate in the orthogonal mode.

The inter-cell coordinator 520 may be independently provided in a location separated from the transmit-receive pairs 511, 512, and 513, and thereby be operated. The inter-cell coordinator 520 may be included in at least one of the transmit-receive pairs 511, 512, and 513. For example, the inter-cell coordinator 520 may be included in a base station (not shown) that belongs to the transmit-receive pairs 511, 512, and 513.

Figure 6:
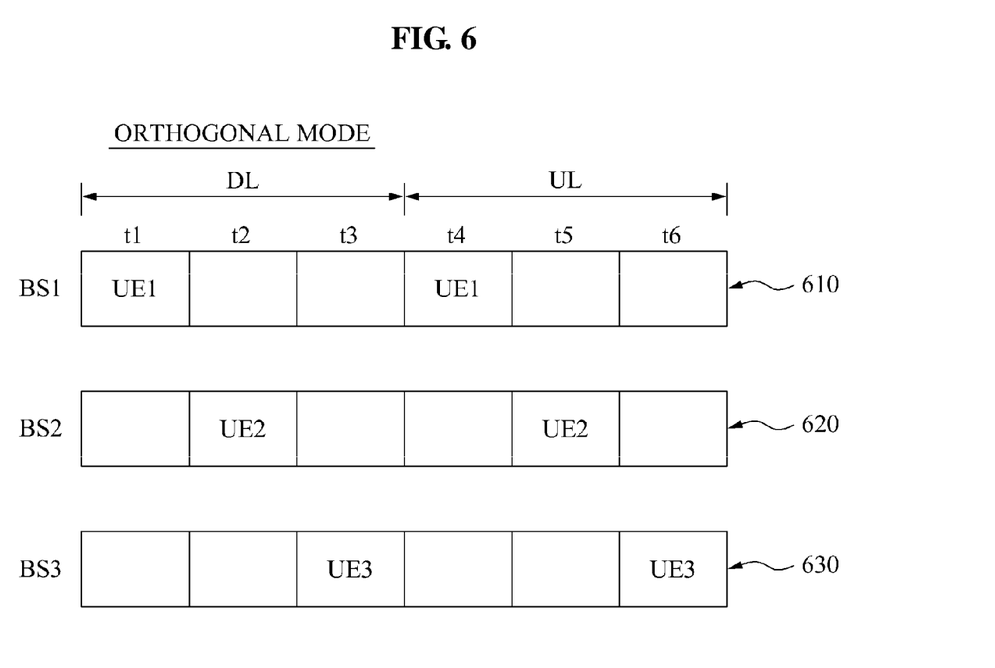
FIG. 6 is a diagram for illustrating exemplary operations between terminals and base stations collecting interference channel information in an orthogonal mode.

FIG. 6 illustrates exemplary operations between terminals and base stations collecting interference channel information in an orthogonal mode.

Referring to FIGS. 1 and 6, an inter-cell coordinator may appropriately schedule a time resource in order to control an operation of transmit-receive pairs in the orthogonal mode. For example, the inter-cell coordinator may determine a transmission order of base stations BS1, BS2, and BS3 in a downlink DL, and a transmission order of terminals UE1, UE2, and UE3 in an uplink UL. Specifically, in a time interval t1 of the downlink DL, the base station BS1 may transmit a signal to the terminal UE1. In a time interval t2, the base station BS2 may transmit a signal to the terminal UE2. In a time interval t3, the base station BS3 may transmit a signal to the terminal UE3. Here, the base station BS1 and the terminal UE1, the base station BS2 and the terminal UE2, and the base station BS3 and the terminal UE3 may comprise the transmit-receive pairs.

Once scheduling of the inter-cell coordinator is completed, the base station BS1 may inform the terminal UE1 that the base station BS1 transmits the signal to the terminal UE1 in the time interval t1, and thus to receive reference signals of neighboring base stations and to measure interference channels in time intervals t2 and t3, using MAP information 610. The MAP information 610 may include a result of the scheduling. The base station BS1 may inform the terminal UE1 to piggy back interference channel information associated with the measured interference channels in a time interval t4.

The base station BS2 may inform the terminal UE2 that the base station BS2 transmits the signal to the terminal UE2 in the time interval t2, and thus to receive reference signals of the neighboring base stations and to measure interference channels in the time intervals t1 and t3, using MAP information 620. The base station BS2 may inform the terminal UE2 to piggy back interference channel information associated with the measured interference channels in a time interval t5.

Similarly, the base station BS3 may inform the terminal UE3 that the base station BS3 transmits the signal to the terminal UE3 in the time interval t3, and thus to receive reference signals of the neighboring base stations and to measure interference channels in the time intervals t1 and t2, using MAP information 630. The base station BS3 may inform the terminal UE3 to piggy back interference channel information associated with the measured interference channels in a time interval t6.

Figure 7:
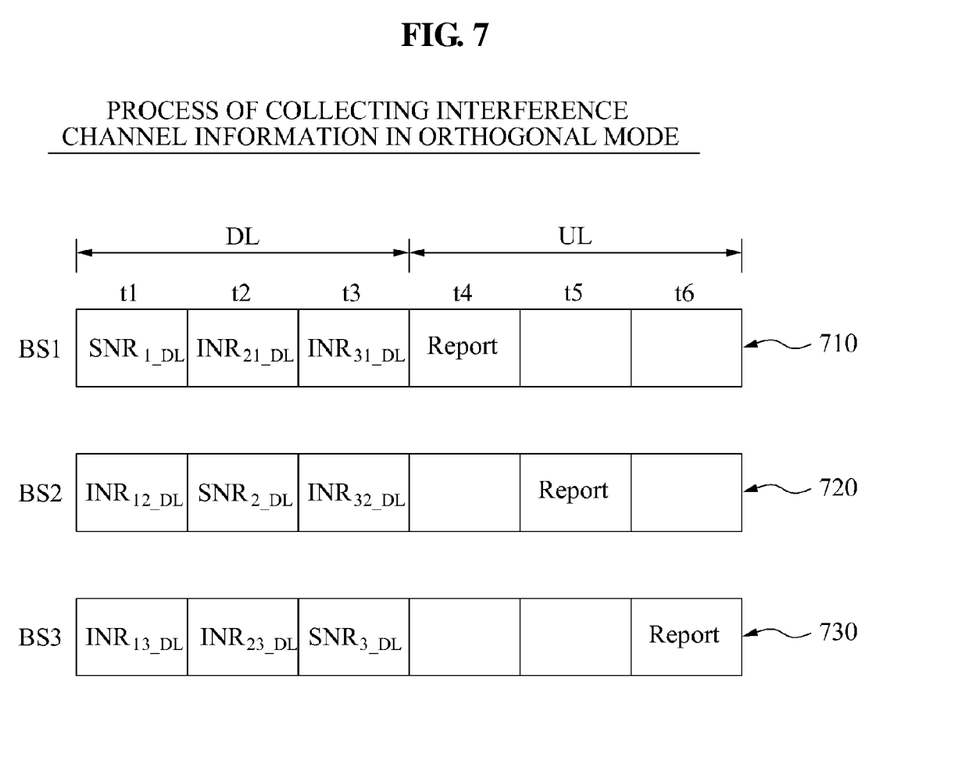
FIG. 7 is a diagram for describing an exemplary process where terminals and base stations collect interference channel information in an orthogonal mode.

FIG. 7 illustrates an exemplary process where terminals and base stations may collect interference channel information in an orthogonal mode.

Referring to FIGS. 6 and 7, as shown in an exemplary process 710 where a base station BS1 and a terminal UE1 collect interference channel information, the terminal UE1 may receive a signal from the base station BS1 and at the same time, measure signal-to-noise ratio (SNR) $SNR_{1\_DL}$ from the base station BS1 to the terminal UE1 based on a reference signal of the base station BS1 in a time interval t1. In time intervals t2 and t3, the terminal UE1 may receive reference signals of neighboring base stations, that is, base stations BS2 and BS3 to measure interference channels and measure an interference and noise ratio (INR) $INR_{21\_DL}$ and $INR_{31\_DL}$ of the interference channels. The terminal UE1 may report to the base station BS1 about $SNR_{1\_DL}$, $INR_{21\_DL}$, and $INR_{31\_DL}$ in a time interval t4.

As shown in an exemplary process 720 where the base station BS2 and a terminal UE2 collect interference channel information, the terminal UE2 may receive a signal from the base station BS2 and at the same time, measure $SNR_{2\_DL}$ from the base station BS2 to the terminal UE2 based on a reference signal of the base station BS2 in the time interval t2. In the time intervals t1 and t3, the terminal UE2 may receive reference signals of neighboring base stations, that is, the base stations BS1 and BS3 to measure interference channels and measure $INR_{12\_DL}$ and $INR_{32\_DL}$ of the interference channels. The terminal UE2 may report to the base station BS2 about $SNR_{2\_DL}$, $INR_{12\_DL}$, and $INR_{32\_DL}$ in a time interval t5.

As shown in an exemplary process 730 where the base station BS3 and a terminal UE3 collect interference channel information, the terminal UE3 may receive a signal from the base station BS3 and at the same time, measure $SNR_{3\_DL}$ from the base station BS3 to the terminal UE3 based on a reference signal of the base station BS3 in the time interval t3. In the time intervals t1 and t2, the terminal UE3 may receive reference signals of neighboring base stations, that is, the base stations BS1 and BS2 to measure interference channel and measure $INR_{13\_DL}$ and $INR_{23\_DL}$ of the interference channels. The terminal UE3 may report to the base station BS3 about $SNR_{3\_DL}$, $INR_{13\_DL}$, and $INR_{23\_DL}$ in a time interval t6.

Figure 8:
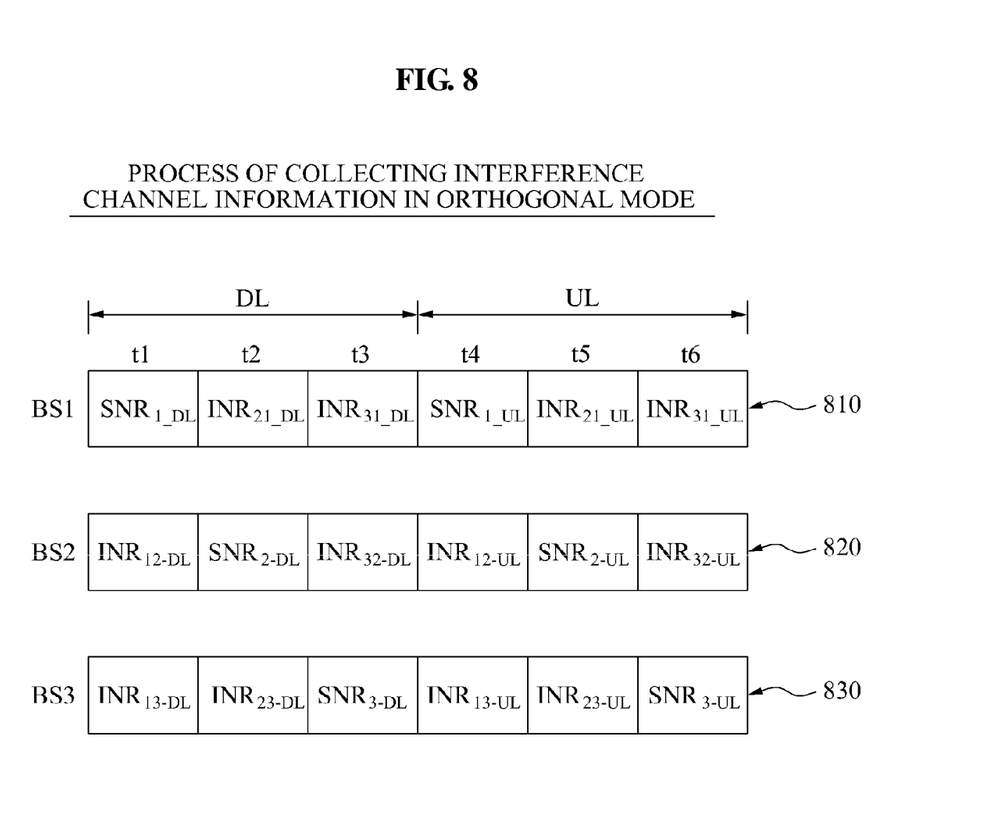
FIG. 8 is a diagram for describing an example of interference channel information collected by terminals and base stations in an orthogonal mode.

FIG. 8 illustrates a diagram to describe an example of interference channel information collected by terminals and base stations in an orthogonal mode.

Processes described above with reference to FIGS. 6 and 7 may be consecutively performed in both a downlink DL and an uplink UL. Referring to FIGS. 6 through 8, the terminal UE1 may report to the base station BS1 about $SNR_{1\_DL}$, $INR_{21\_DL}$, and $INR_{31\_DL}$ in the time interval t4. The terminal UE2 may report to the base station BS2 about $SNR_{2\_DL}$, $INR_{12\_DL}$, and $INR_{32\_DL}$ in the time interval t5. The terminal UE3 may report to the base station BS3 about $SNR_{3\_DL}$, $INR_{13\_DL}$, and $INR_{23\_DL}$ in the time interval t6.

As shown in an exemplary collection result 810 of interference channel information of the base station BS1 and the terminal UE1, as soon as the base station BS1 receives the report of $SNR_{1\_DL}$, $INR_{21\_DL}$, and $INR_{31\_DL}$ from the terminal UE1 in the time interval t4, the base station BS1 may simultaneously measure $SNR_{1\_UL}$ in the uplink UL from the terminal UE1 to the base station BS1. In the time intervals t5 and t6, the base station BS1 may measure $INR_{2\_UL}$ and $INR_{31\_UL}$ with respect to interference channels from neighboring terminals UE2 and UE3 of the uplink UL. $SNR_{1\_UL}$, $INR_{21\_UL}$, and $INR_{31\_UL}$ may be reported to the terminals UE1, UE2, and UE3 in a subsequent time interval (not shown) of the uplink UL.

As shown in an exemplary collection result 820 of interference channel information of the base station BS2 and the terminal UE2, as soon as the base station BS2 receives the report of $SNR_{2\_DL}$, $INR_{12\_DL}$, and $INR_{32\_DL}$ from the terminal UE2 in the time interval t5, the base station BS2 may simultaneously measure $SNR_{2\_UL}$ in the uplink from the terminal UE2 to the base station BS2. In the time intervals t4 and t6, the base station BS2 may measure $INR_{12\_UL}$ and $INR_{32\_UL}$ with respect to interference channels from neighboring terminals UE1 and UE3 of the uplink UL. $SNR_{2\_UL}$, $INR_{12\_UL}$, and $INR_{32\_UL}$ may be reported to the terminals UE1, UE2, and UE3 in a subsequent time interval (not shown) of the uplink UL.

As shown in an exemplary collection result 830 of interference channel information of the base station BS3 and the terminal UE3, as soon as the base station BS3 receives the report of $SNR_{3\_DL}$, $INR_{13\_DL}$, and $INR_{23\_DL}$ from the terminal UE3 in the time interval t6, the base station BS3 may simultaneously measure $SNR_{3\_UL}$ in the uplink from the terminal UE3 to the base station BS3. In the time intervals t4 and t5, the base station BS3 may measure $INR_{13\_UL}$ and $TNR_{23\_UL}$ with respect to interference channels from neighboring terminals UE1 and UE2. $SNR_{3\_UL}$, $INR_{13\_UL}$, and $INR_{23\_UL}$, may be informed to the terminals UE1, UE2, and UE3 in a subsequent time interval (not shown) of the uplink UL.

Where collecting of the interference channel information in the orthogonal mode is completed through embodiments described above with reference to FIGS. 6 through 8, the inter-cell coordinator may determine whether the transmit-receive pairs may successfully use the simultaneous transmission/reception scheme based on the collected interference channel information.

Where the transmit-receive pairs may successfully use the simultaneous transmission/reception scheme, the inter-cell coordinator may change the orthogonal mode to the concurrent mode. Information required by the transmit-receive pairs to apply the simultaneous transmission/reception scheme, for example, information associated with the changed concurrent mode, information associated with the interference signal processing scheme, and the like may be provided to the transmit-receive pairs.

Where the transmit-receive pairs may not successfully use the simultaneous transmission/reception scheme, the inter-cell coordinator may maintain the orthogonal mode and continuously collect the interference channel information.

Figure 9:
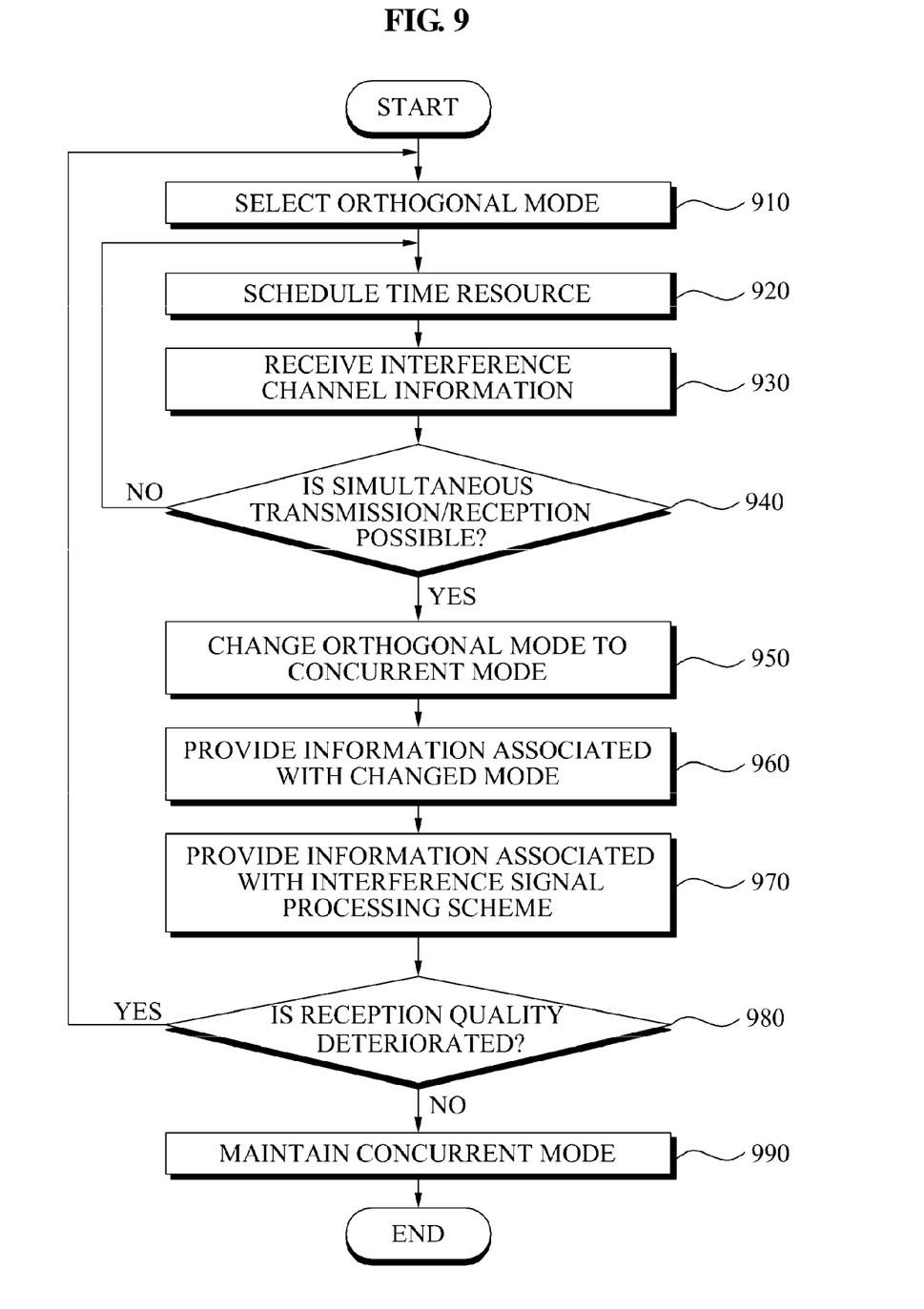
FIG. 9 is a flowchart illustrating an exemplary method of adaptively determining any one mode from an orthogonal mode and a concurrent mode to perform operation according to the determined mode.

FIG. 9 illustrates an exemplary method of adaptively determining any one mode of an orthogonal mode and a concurrent mode to perform operation according to the determined mode.

In operation 910, an inter-cell coordinator selects an orthogonal mode from the orthogonal mode and a concurrent mode at an initial point in time where transmit-receive pairs are determined.

In operation 920, the inter-cell coordinator schedules a time resource in association with collecting of interference channel information via the transmit-receive pairs, so that the transmit-receive pairs may operate as desired in the orthogonal mode. Scheduling information may be provided to the transmit-receive pairs and the transmit-receive pairs may collect the interference channel information based on the scheduling information.

In operation 930, the inter-cell coordinator receives the collected interference channel information from the transmit-receive pairs.

In operation 940, the inter-cell coordinator determines whether the transmit-receive pairs may perform a simultaneous transmission/reception based on the interference channel information.

Where the transmit-receive pairs may not perform the simultaneous transmission/reception, the inter-cell coordinator iterates operations 920 through 940 while maintaining the orthogonal mode.

Where the transmit-receive pairs may perform the simultaneous transmission/reception, the inter-cell coordinator changes the orthogonal mode to the concurrent mode in operation 950.

In operation 960, the inter-cell coordinator provides information associated with the changed mode, that is, the concurrent mode to the transmit-receive pairs.

In operation 970, the inter-cell coordinator provides, to the transmit-receive pairs, information associated with an interference signal processing scheme and the like, so that the transmit-receive pairs may use a simultaneous transmission/reception scheme.

The transmit-receive pairs may continuously check a reception quality while performing communication using the simultaneous transmission/reception scheme. Where the reception quality of a particular transmit-receive pair decreases to be less than a particular level, the particular transmit-receive pair may report to the inter-cell coordinator that the reception quality is deteriorated.

In operation 980, the inter-cell coordinator monitors whether the reception quality of the transmit-receive pairs is deteriorated in the concurrent mode. Where the reception quality is not deteriorated, the inter-cell coordinator maintains the concurrent mode in operation 990. Where the reception quality is deteriorated, the inter-cell coordinator changes the concurrent mode to the orthogonal mode to perform operations 910 through 930.

Figure 10:
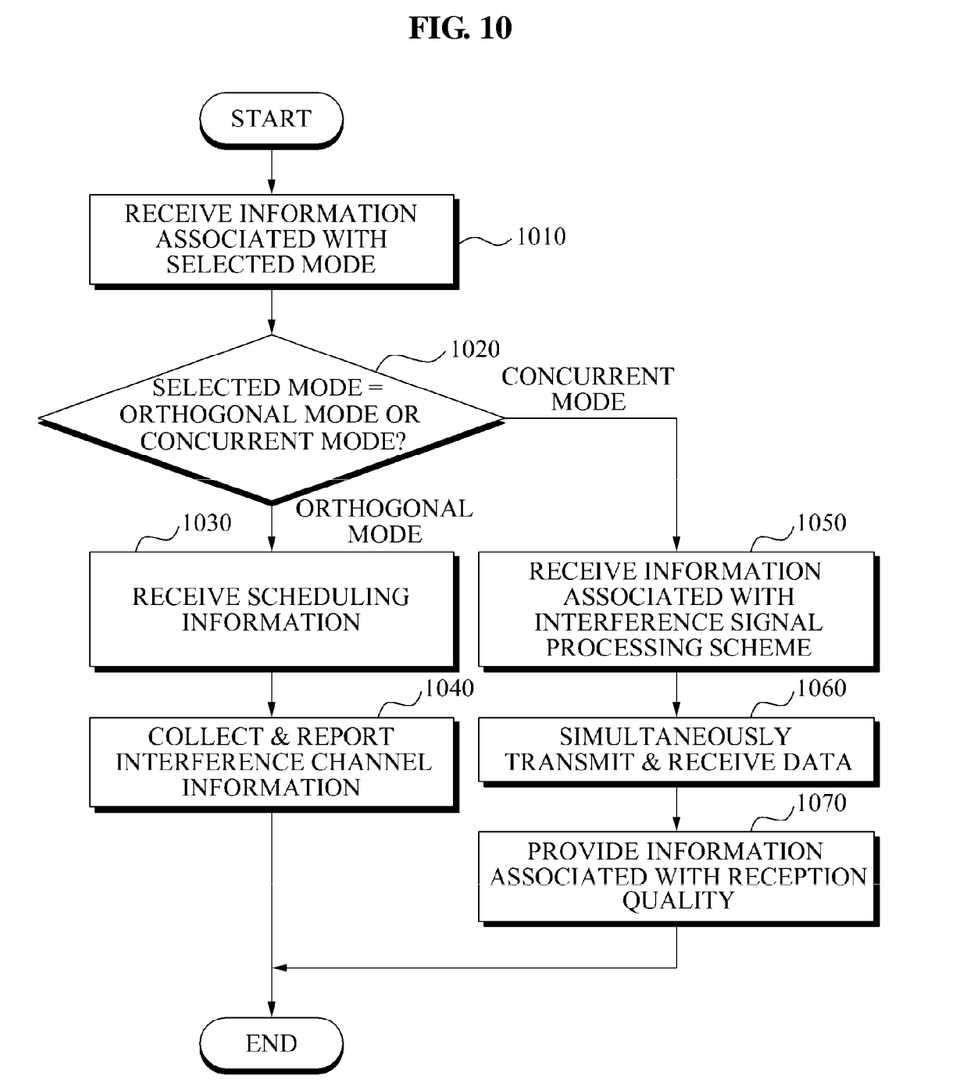
FIG. 10 is a flowchart illustrating an exemplary communication method of a base station and a terminal that organically operate with an inter-cell coordinator.

FIG. 10 illustrates an exemplary communication method of a base station and a terminal that organically operates with an inter-cell coordinator.

In operation 1010, the base station and the terminal (also referred to as a transmit-receive pair) receive information associated with a selected mode from an inter-cell coordinator.

In operation 1020, the transmit-receive pair determine whether the selected mode is an orthogonal mode or a concurrent mode.

Where the selected mode is the orthogonal mode, the transmit-receive pair receive scheduling information associated with collecting of interference channel information from the inter-cell coordinator in operation 1030.

In operation 1040, the transmit-receive pair collect the interference channel information based on the scheduling information, and report to the inter-cell coordinator about the collected interference channel information. The transmit-receive pair may collect and report interference channel information in a time interval different from time intervals for neighboring transmit-receive pairs.

Where the selected mode is the concurrent mode, the transmit-receive pair receive information associated with an interference signal processing scheme in operation 1050.

In operation 1060, the transmit-receive pair simultaneously transmit and receive data with the neighboring transmit-receive pairs using an interference control scheme or a transmit power control scheme, based on information associated with the interference signal processing scheme.

In operation 1070, the transmit-receive pair provide, to the inter-cell coordinator, information associated with a reception quality used to determine whether the interference channel information is valid.

Figure 11:
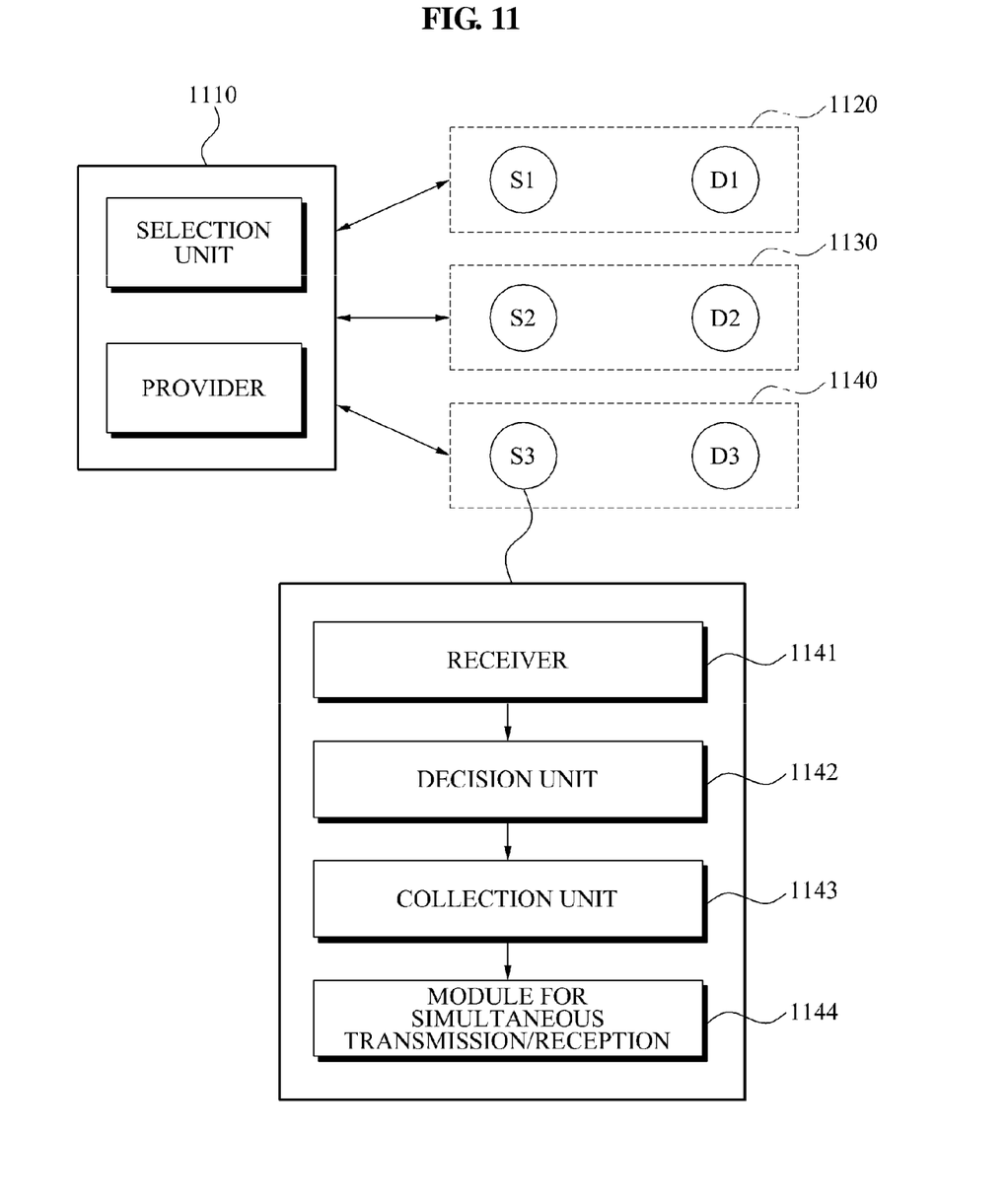
FIG. 11 is a diagram illustrating an exemplary inter-cell coordinator and a communication apparatus for a base station or a terminal.

FIG. 11 illustrates an exemplary inter-cell coordinator 1110 and a communication apparatus for a base station or a terminal The communication system may include the inter-cell coordinator 1110 and transmit-receive pairs 1120, 1130, and 1140.

The inter-cell coordinator 1110 may include a selection unit and a provider.

The selection unit may select any one mode from an orthogonal mode and a concurrent mode in association with a scheme where the plurality of transmit-receive pairs 1120, 1130, and 1140 collects interference channel information. For example, where a previously selected mode is the orthogonal mode, the selection unit may select any one mode from the orthogonal mode and the concurrent mode by considering whether the plurality of transmit-receive pairs 1120, 1130, and 1140 may apply a simultaneous transmission/reception scheme based on the collected interference channel information.

Where the previously selected mode is the concurrent mode, the selection unit may select any one mode from the orthogonal mode and the concurrent mode depending on whether the collected interference channel information is valid.

The provider may provide information associated with the selected mode to the plurality of transmit-receive pairs 1120, 1130, and 1140. For example, where the concurrent mode is selected, the provider may provide, to the plurality of transmit-receive pairs 1120, 1130, and 1140, information used by the plurality of transmit-receive pairs 1120, 1130, and 1140 for applying the simultaneous transmission/reception scheme.

The communication apparatus for the plurality of transmit-receive pairs 1120, 1130, and 1140 may include a receiver 1141, a decision unit 1142, a collection unit 1143, and a module for a simultaneous transmission/reception 1144.

The receiver 1141 may receive, from the inter-cell coordinator 1110, information associated with a mode selected between the orthogonal mode and the concurrent mode.

The decision unit 1142 may determine whether the selected mode is the orthogonal mode or the concurrent mode.

Where the selected mode is the orthogonal mode, the collection unit 1143 may collect interference channel information in a time interval different from time intervals for neighboring transmit-receive pairs in order to report the interference channel information to the inter-cell coordinator 1110.

Where the selected mode is the concurrent mode, the module for the simultaneous transmission/reception 1144 may apply the simultaneous transmission/reception scheme together with the neighboring transmit-receive pairs.

Descriptions made above with reference to FIGS. 1 through 10 may be applicable to the inter-cell coordinator 1110 and the communication apparatus for the transmit-receive pairs 1120, 1130, and 1140, and thus further descriptions will be omitted for conciseness.

According to example(s) described above, it is possible to collect interference channel information with less overhead by appropriately selecting any one mode from an orthogonal mode and a concurrent mode.

Also, according to examples(s) described above, it is possible to enhance a frequency efficiency and to quickly update interference channel information by shifting a mode from an orthogonal mode to a concurrent mode, or from the concurrent mode to the orthogonal mode depending on whether the interference channel information is valid, whether simultaneous transmission and reception is possible, and the like.

Accordingly, interference channel information may be shared in a communication system that has a plurality of transmit-receive pairs using the same frequency resource, with less overhead and ability to more quickly verify a change in the interference channel information.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. The media and program instructions may be those specially designed and constructed, or they may be of the kind well-known and available to those having skill in the computer software arts.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication control method comprising:
    selecting any one mode from an orthogonal mode and a concurrent mode in association with a scheme where a plurality of transmit-receive pairs collects interference channel information; and
    providing information associated with the selected mode to the plurality of transmit-receive pairs,
    wherein each of the transmit-receive pairs collects the interference channel information in a different time interval in the orthogonal mode, and the plurality of transmit-receive pairs applies a simultaneous transmission/reception scheme based on the collected interference channel information in the concurrent mode.

2. The method of claim 1, wherein, where a previously selected mode is the orthogonal mode, the selecting of any one mode comprises selecting any one mode from the orthogonal mode and the concurrent mode by considering whether the plurality of transmit-receive pairs applies the simultaneous transmission/reception scheme based on the collected interference channel information.

3. The method of claim 1, wherein, where a previously selected mode is the concurrent mode, the selecting of any one mode comprises selecting any one mode from the orthogonal mode and the concurrent mode depending on whether the collected interference channel information is valid.

4. The method of claim 3, wherein whether the collected interference channel information is valid is predicted based on a reception quality of the transmit-receive pairs.

5. The method of claim 1, further comprising:
    providing, to the plurality of transmit-receive pairs, information used by the plurality of transmit-receive pairs in order to apply the simultaneous transmission/reception scheme where the concurrent mode is selected.

6. The method of claim 5, wherein information used by the plurality of transmit-receive pairs in order to apply the simultaneous transmission/reception scheme includes information associated with an interference signal processing scheme.

7. The method of claim 1, wherein the providing of information comprises providing information associated with the selected mode where the selected mode is changed.

8. The method of claim 1, wherein, in the concurrent mode, the plurality of transmit-receive pairs applies the simultaneous transmission/reception scheme and suspends collecting of interference channel information.

9. The method of claim 1, wherein the simultaneous transmission/reception scheme includes an interference control scheme or a transmit power control scheme.

10. The method of claim 1, further comprising:
    scheduling a time resource so that each of the transmit-receive pairs collects the interference channel information in the different time interval, where the orthogonal mode is selected.

11. The method of claim 10, wherein the scheduling of the time resource comprises scheduling the time resource so that the plurality of transmit-receive pairs sequentially measures interference channels to sequentially report the interference channel information with respect to the measured interference channels in the orthogonal mode.

12. The method of claim 1, wherein the selecting of any one mode comprises selecting the orthogonal mode at an initial point in time where the plurality of transmit-receive pairs is constructed.

13. The method of claim 1, wherein the plurality of transmit-receive pairs uses the same frequency resource.

14. A communication method of a transmit-receive pair, the method comprising:
    receiving, from an inter-cell coordinator, information associated with a mode selected between an orthogonal mode and a concurrent mode;
    determining whether the selected mode is the orthogonal mode or the concurrent mode;
    collecting interference channel information in a time interval different from time intervals for neighboring transmit-receive pairs in order to report the interference channel information to the inter-cell coordinator, where the selected mode is the orthogonal mode; and
    applying a simultaneous transmission/reception scheme together with the neighboring transmit-receive pairs, where the selected mode is the concurrent mode.

15. The method of claim 14, further comprising:
    providing, to the inter-cell coordinator, information associated with a reception quality of the transmit-receive pairs that is used to determine whether to change the selected mode, where the selected mode is the concurrent mode.

16. The method of claim 15, wherein the providing of information comprises providing, to the inter-cell coordinator, information associated with the reception quality of the transmit-receive pairs, where the reception quality is less than a particular level.

17. The method of claim 14, wherein the collecting of interference channel information comprises:
receiving scheduling information associated with a time resource to collect the interference channel information; and
obtaining the interference channel information in the time interval different from the time intervals for the neighboring transmit-receive pairs based on the scheduling information.

18. The method of claim 14, wherein the applying of the simultaneous transmission/reception scheme comprises applying the simultaneous transmission/reception scheme and suspending the collection of interference channel information, where the selected mode is the concurrent mode.

19. The method of claim 14, wherein the simultaneous transmission/reception scheme includes an interference control scheme or a transmission power control scheme.

20. A non-transitory computer-readable recording medium storing a program to implement the method of claim 1.

21. An inter-cell coordinator comprising:
a selection unit configured to select any one mode from an orthogonal mode and a concurrent mode in association with a scheme where a plurality of transmit-receive pairs collects interference channel information; and
a provider configured to provide information associated with the selected mode to the plurality of transmit-receive pairs,
wherein each of the transmit-receive pairs collects the interference channel information in a different time interval in the orthogonal mode, and the plurality of transmit-receive pairs applies a simultaneous transmission/reception scheme based on the collected interference channel information in the concurrent mode.

22. A communication apparatus for a transmit-receive pair, the communication apparatus comprising:
a receiver configured to receive, from an inter-cell coordinator, information associated with a mode selected between an orthogonal mode and a concurrent mode;
a decision unit configured to determine whether the selected mode is the orthogonal mode or the concurrent mode;
a collection unit configured to collect interference channel information in a time interval different from time intervals for neighboring transmit-receive pairs in order to report the interference channel information to the inter-cell coordinator, where the selected mode is the orthogonal mode; and
a module configured to apply a simultaneous transmission/reception scheme together with the neighboring transmit-receive pairs, where the selected mode is the concurrent mode.

* * * * *